US 8,523,367 B2

(12) United States Patent  
Ogura

(10) Patent No.: US 8,523,367 B2  
(45) Date of Patent: Sep. 3, 2013

(54) LIGHT SOURCE UNIT INCLUDING A LASER AS A LIGHT SOURCE AND A LIGHT EMITTING WHEEL WITH A DIFFUSION LAYER OPPOSITE TO THE LASER

(75) Inventor: Naotsugu Ogura, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 587 days.

(21) Appl. No.: 12/749,709

(22) Filed: Mar. 30, 2010

(65) Prior Publication Data

US 2010/0245777 A1    Sep. 30, 2010

(30) Foreign Application Priority Data

Mar. 31, 2009 (JP) ................................. 2009-085422

(51) Int. Cl.
*G03B 21/14* (2006.01)
(52) U.S. Cl.
USPC ............................................................ 353/84
(58) Field of Classification Search
USPC .................. 353/85, 94, 98, 84, 30, 37, 50
See application file for complete search history.

(56) References Cited

U.S. PATENT DOCUMENTS

| | | | |
|---|---|---|---|
| 6,586,874 B1 | 7/2003 | Komoto et al. | |
| 6,874,893 B2 | 4/2005 | Park | |
| 7,070,300 B2 * | 7/2006 | Harbers et al. | 362/231 |
| 7,547,114 B2 * | 6/2009 | Li et al. | 362/231 |
| 7,651,243 B2 * | 1/2010 | McGuire et al. | 362/293 |
| 2001/0050816 A1 * | 12/2001 | Suzuki et al. | 359/599 |
| 2002/0054259 A1 * | 5/2002 | Funahata et al. | 349/113 |
| 2003/0026002 A1 * | 2/2003 | Lopez-Hernandez et al. | 359/641 |
| 2007/0019408 A1 * | 1/2007 | McGuire et al. | 362/231 |
| 2009/0034284 A1 * | 2/2009 | Li et al. | 362/554 |
| 2010/0315604 A1 * | 12/2010 | Peeters et al. | 353/84 |

FOREIGN PATENT DOCUMENTS

| | | |
|---|---|---|
| JP | 2-163733 A | 6/1990 |
| JP | 2-271827 A | 11/1990 |
| JP | 8-007614 A | 1/1996 |
| JP | 10-319877 A | 12/1998 |
| JP | 2003-295319 A | 10/2003 |
| JP | 2004-234001 A | 8/2004 |
| JP | 2004-325874 A | 11/2004 |

(Continued)

OTHER PUBLICATIONS

Japanese Office Action (Notification of Reasons for Refusal) dated Jun. 9, 2011 (and English translation thereof) in counterpart Japanese Application No. 2009-085422.

(Continued)

*Primary Examiner* — Georgia Y Epps
*Assistant Examiner* — Bao-Luan Le
(74) *Attorney, Agent, or Firm* — Holtz, Holtz, Goodman & Chick, P.C.

(57) ABSTRACT

A projector includes a light source unit 63, a light guiding device 75, a display device, a projection side optical system and a projector control means, the light source unit 63 includes a light source 72 which emits laser light in the wavelength band of blue, a light emitting wheel 71 disposed on an optical axis of the light source 72 and a wheel motor 73 for driving to rotate the light emitting wheel 71, and the light emitting wheel 71 is formed of a circular substrate having a diffusion layer on a predetermined surface thereof, the diffusion layer being made up of minute irregularities which are formed directly on a surface of the circular substrate.

8 Claims, 7 Drawing Sheets

(56) References Cited

FOREIGN PATENT DOCUMENTS

| JP | 2004-327361 A | 11/2004 |
| JP | 2004-341105 A | 12/2004 |
| JP | 2004-347711 A | 12/2004 |
| JP | 2006-220762 A | 8/2006 |
| JP | 2006-301114 A | 11/2006 |
| JP | 2007-207939 A | 8/2007 |
| JP | 2007-218956 A | 8/2007 |
| JP | 2008-293838 A | 12/2008 |

OTHER PUBLICATIONS

Japanese Office Action dated Aug. 25, 2011 (and English translation thereof) in counterpart Japanese Application No. 2009-085422.
Japanese Office Action (Notification of Reasons for Refusal) dated Mar. 24, 2011 (and English translation thereof) in counterpart Japanese Application No. 2009-085422.

* cited by examiner

LIGHT SOURCE UNIT INCLUDING A LASER AS A LIGHT SOURCE AND A LIGHT EMITTING WHEEL WITH A DIFFUSION LAYER OPPOSITE TO THE LASER

CROSS-REFERENCE TO RELATED APPLICATIONS

This application is based upon and claims the benefit of priority under 35 USC 119 of Japanese Patent Application No. 2009-085422 filed on Mar. 31, 2009, the entire disclosure of which, including the description, claims, drawings and abstract, is incorporated herein by reference.

BACKGROUND OF THE INVENTION

1. Field of the Invention

The present invention relates to a light source unit including a light emitting wheel and a projector including the light source unit.

2. Description of the Related Art

In these days, data projectors are used in many cases as image projection apparatuses which project screens or video images of personal computers and further images based on image data stored in memory cards on to a screen. These projectors are such that light emitted from a light source is concentrated on a micromirror device called a DMD (Digital Micromirror Device) or a liquid crystal plate for display of a color image on the screen.

In projectors of the type described above, conventionally, projectors using a high-intensity discharge lamp as a light source have been the mainstream of projectors. In recent years, however, there have been made many developments and proposals on light source units which use as a light source, a solid-state light emitting device such as a light emitting diode, a laser diode or an organic DL.

In a case where a light emitting diode is used as a light source of a projector, an output of a single light emitting diode is weak and therefore, a plurality of light emitting diodes need to be used altogether at the same time to obtain a high output. In a case where a plurality of light emitting diodes are used to form a light source unit, however, due to an increase in the number of bright points of the light source unit, it becomes difficult to concentrate light emitted from the individual bright points to a single point by an optical system once it has been so emitted, leading to a problem that the utilization efficiency of light emitted from the individual light emitting diodes is reduced. In addition, since the value of Etendue is large, there is much light which is unnecessary or is not used, leading to a problem that the utilization efficiency of the light emitting diodes is reduced. Note that Etendue is a value which represents the spatial expansion of effective light as a product of area and solid angle and which is preserved in the optical system. Consequently, the fact that the value of Etendue of a light source unit is larger than the value of Etendue of a DMD means that the amount of light which becomes unnecessary light increases.

In order to solve these problems, as is described in Japanese Unexamined Patent Publication No. 2004-327361, there is a situation in which a plurality of light emitting diodes are disposed in proximity to an outer surface of a spherical housing which is hollow and whose inner surface is formed into a reflecting surface, fluorescent materials are disposed at a central point of the spherical housing, whereby light emitted from the light emitting diodes is used as excitation light which causes the fluorescent material to emit light for use.

In addition, as is described in Japanese Unexamined Patent Publication No. 2004-341105, there is a situation in which excitation light is shone from a rear surface of a fluorescent wheel which is made up of a circular substrate and fluorescent materials which are disposed on the circular substrate in a circumferential direction for emission of beams of light in the wavelength bands of red, green and blue, which are three primary colors of light, and light emitted from the fluorescent materials is caused to be emitted from a front surface side of the fluorescent wheel for use.

Further, as is described in Japanese Unexamined Patent Publication No. 2003-295319, there is a situation in which a high-output laser diode is used in a light source unit in place of light emitting diodes. In this light source unit, fluorescent materials are disposed within a paraboloidal reflector and a laser beam is shone on to the fluorescent materials via a collimator lens (a collimating lens) and a condenser lens, whereby light produced by luminescence of the fluorescent materials is converted into parallel light by the reflector for use.

Although a higher output of the laser diode than that of the light emitting diode can compensate for the insufficient output of the light emitting diode, since coherent light (light with complete phase relationships) is emitted, when laser light is emitted directly to the outside of the light source unit or a projector which includes the light source unit in the form of coherent light, there exists a danger in which the eyes of a human being are badly affected. In the related art in which the laser diode is used as the light source, although there is no risk of light emitted from the laser diode is emitted directly to the outside of the projector in such a state that the fluorescent materials are excited, in the event that the fluorescent materials are dislodged due to heat or deterioration with age, there has been a fear that light emitted from the laser diode is emitted directly to the outside of the projector. To solve this problem, there is an electrical control method in which a device is disposed in a light source unit for detecting the dislodgement of fluorescent materials, and when the dislodgement of the fluorescent materials is detected, the light emission of the light source is stopped immediately. In this electrical control described above, however, since there is caused a slight time lag, light emitted from the laser diode is allowed to be emitted directly to the outside of a projector for a minute period of time in reality. As described, since light emitted from the laser diode constitutes coherent light and its output is very high, should such laser light be emitted directly to the outside of the projector even for a minute period of time, a seriously dangerous thing will result therefrom.

In addition, in addition to the emission of laser light to the outside of the projector, in the event that high-output coherent light which is light emitted from the laser diode is shone on to various types of devices disposed within a housing of electric equipment, heat stays where the coherent light is so shone, which triggers a risk that the devices fail or a risk that adhesives are deteriorated with age.

SUMMARY OF THE INVENTION

The invention has been made in view of the problems inherent in the related art and an object thereof is to provide a light source unit which utilizes a laser diode and which is much safer than the related art light source units and a small, thin projector which includes the same light source unit.

According to one preferred aspect of the invention, there is provided a light source unit comprising a light source for shining light and a light emitting member for emitting light using light shone from the light source as excitation light, wherein the light emitting member has a diffusion layer in at least a light shining area where light from the light source is shone for diffusion of the light so shone.

BRIEF DESCRIPTION OF THE DRAWINGS

The above and further objects, characteristics and advantages of the invention will be more obvious from accompanying drawings and the following detailed description of the invention. In the drawings.

DETAILED DESCRIPTION OF THE PREFERRED EMBODIMENT

Hereinafter, a best mode for carrying out the invention will be described by use of the accompanying drawings. However, in the following embodiment, although various preferred technical limitations will be described as being made for carrying out the invention, the scope of the invention is not limited at all to the following embodiment and illustrated examples.

A summary of a mode for carrying out the invention will be described below.

A projector 10 includes a light source unit 63, a light guiding device 75, a display device 51, a projection side optical system 90, and a projector control means. This light source unit 63 includes a light source 72 for emitting laser light in the wavelength band of blue, a light emitting wheel 71 disposed on an optical axis of the light source 72, and a wheel motor 73 for driving to rotate the light emitting wheel and emits light in predetermined wavelength bands by controlling the light emitting wheel 71.

In addition, the light emitting wheel 71 has a circular disc shape and includes a diffusion layer 132 which is provided on a predetermined surface thereof. The light emitting wheel 71 is formed of a highly light transmissive circular substrate 131. Further, the light emitting wheel 71 has set thereon an annular shining area where a red area 71R, a green area 71G and a blue area 71B are provided end to end in a circumferential direction. The red area 71R emits light in the wavelength band of red, the green area 71G emits light in the wavelength band of green, and the blue area 71B emits light which is emitted from the light source and is diffused by the diffusion layer as light in the wavelength band of blue. A red fluorescent material layer 133R is disposed on the red area 71R for emitting light in the wavelength band of red using the light emitted from the light source 72 as excitation light. A green fluorescent material layer 133G is disposed on the green area 71G for emitting light in the wavelength band of green using the light from the light source 72 as excitation light.

The diffusion layer 132 is formed of minute irregularities which are formed directly on the front surface of the light emitting wheel 71, and the minute irregularities are formed at intervals ranging from 10 μm to 100 μm.

The light source 63 has a collimator lens 141 in front of the light source 72, and includes a light gathering or light gathering optical system made up of a light gathering lens group 145, a condenser lens 146 and a light guiding device incident lens 147 between the light emitting wheel 71 and the light guiding device 75.

Next, an embodiment of the invention will be described based on the drawings.

Figure 1:
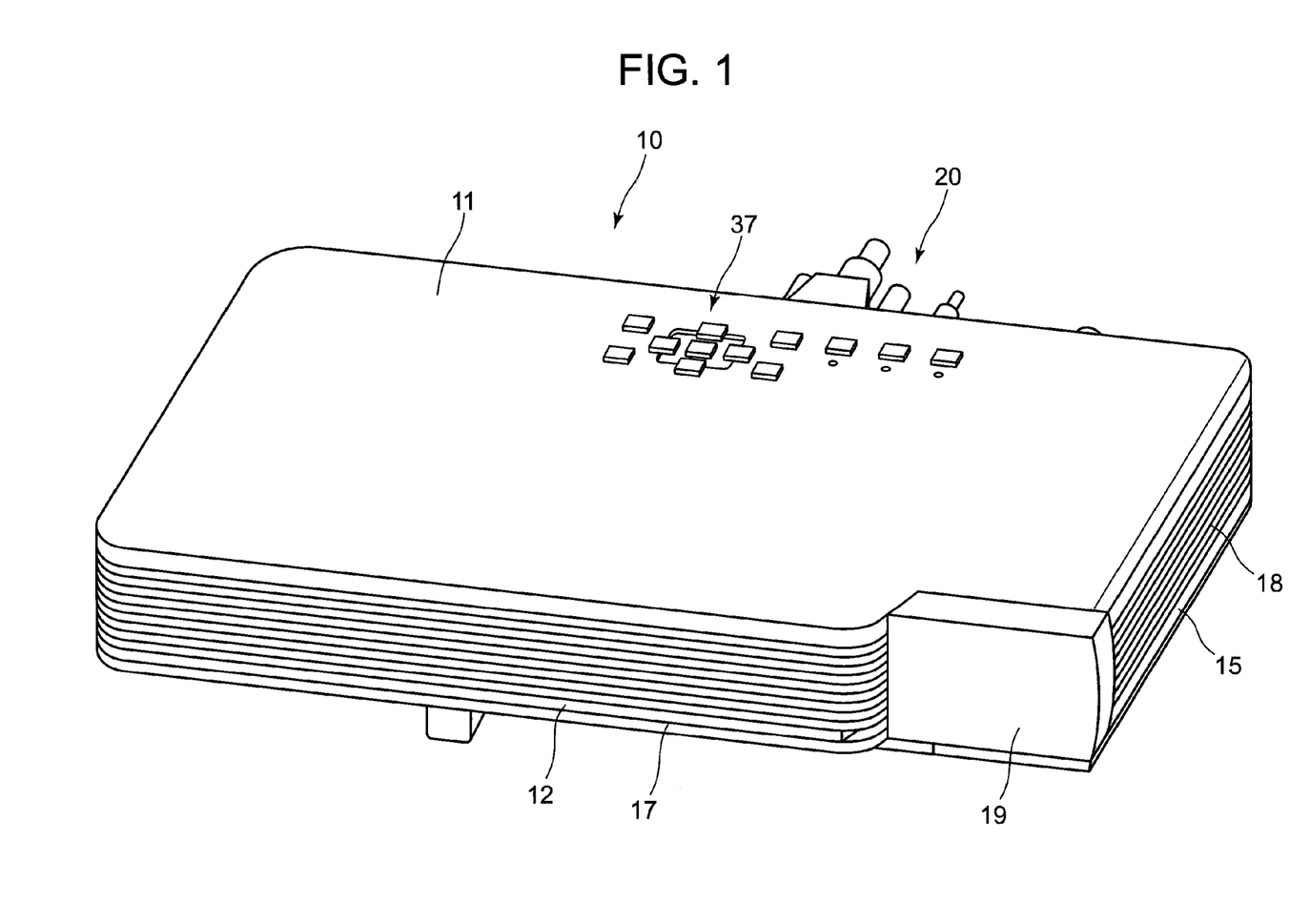
FIG. 1 is a perspective view showing an external appearance of an embodiment of a projector which utilizes a light source unit according to the invention.

FIG. 1 is a perspective view showing an external appearance of a projector 10. When used in this embodiment, left and right denote left and right directions with respect to a projecting direction, and front and rear denote front and rear directions with respect to a traveling direction of a light beam. As is shown in FIG. 1, the projector 10 has a substantially rectangular parallelepiped shape and has a lens cover 19 which covers a projection port which lies to a side of a front panel 12 which is referred to as a front side panel of a main body case, as well as a plurality of outlet holes 17 in the front panel 12. Further, although not shown, the projector 10 includes an Ir reception part for receiving a control signal from a remote controller.

In addition, a keys/indicators part 37 is provided on an upper side panel 11 which constitutes the main body case, and disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the main body case are an input/output connectors part where USB terminals, an image signal input D-SUB terminal, an S terminal, an RCA terminal and the like are provided and various types of terminals 20 including a power supply adaptor plug and the like. A plurality of inlet holes 18 are formed in proximity to lower portions of a right-hand side panel 14 which constitutes a side panel, not shown, of the main body case and a left-hand side panel 15 which is a side panel shown in FIG. 1.

Figure 2:
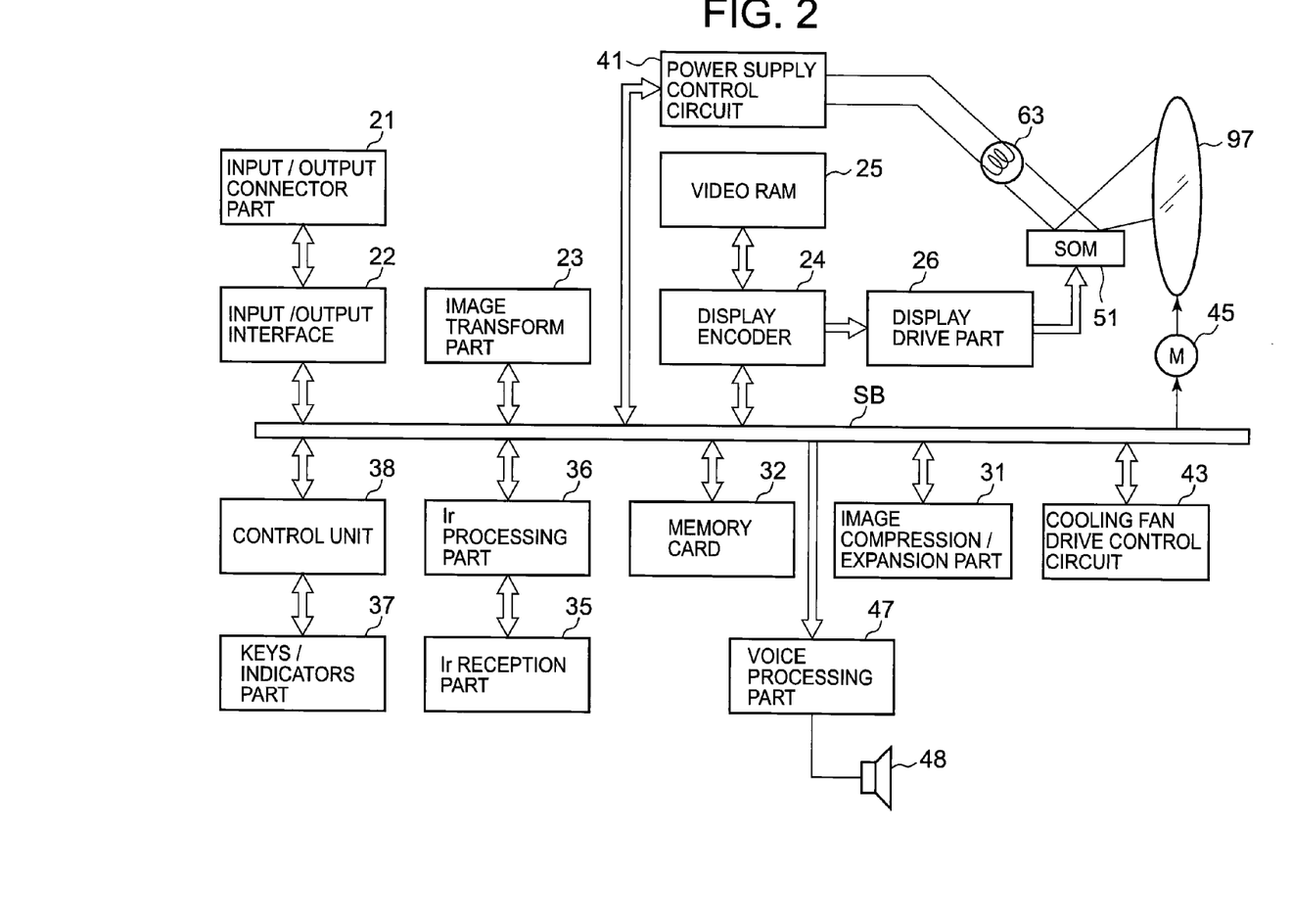
FIG. 2 is a functional circuit block diagram of the projector which utilizes the light source unit according to the invention.

Next, a projector control means of the projector 10 will be described by use of the block diagram in FIG. 2. The projector control means is made up of the control unit 38, an input/output interface 22, an image transform part 23, a display encoder 24, a display drive part 26 and the like. Image signals of various standards inputted from an input/output connector part 21 are sent via the input/output interface 22 and a system bus (SB) to the image transform part 23 where the image signals are transformed so as to be unified into an image signal of a predetermined format suitable for display and are thereafter outputted to the display encoder 24.

The display encoder 24 deploys the image signal inputted thereinto on a video RAM 25 for storage and generates a video signal from the contents stored in the video RAM 25, outputting the video signal so generated to the display drive part 26.

The display drive part 26 drives a display device 51 which is a spatial optical modulator (SOM) at an appropriate frame rate in accordance with the image signal outputted from the display encoder 24. Namely, a light beam emitted from the light source unit 63 is caused to enter the display device 51 via a light source side optical system to thereby form an optical image by reflected light from the display device 51, and the optical image so formed is then projected on to a screen, not shown, for display via a projection system lens group which is referred to as a projection side optical system. A movable lens group 97 of the projection side optical system is driven by a lens motor 45 for zooming or focusing.

An image compression/expansion part 31 performs a recording operation in which an intensity signal and a color-difference signal of image signals are data compressed through processings such as ADCT and Huffman coding so as to write them sequentially on a memory card 32 which is referred to as a detachable recording medium. Further, when in a reproducing mode, the image compression/expansion part 31 reads out image data recorded on the memory card 32 and expands individual image data which make up a series of time-varying images frame by frame. The image compression/expansion part 31 then performs an operation in which the image data is outputted to the display encoder 24 via the image transform part 23 so as to enable the display of time-varying images based on the image data stored on the memory card 32.

The control unit 38 is such as to govern operations of respective circuitries within the projector 10 and is made up of a CPU, a ROM which stores in a fixed fashion operation programs of various types of settings and a RAM which is used as a work memory.

Operation signals from the keys/indicators part 37 which is made up of the main keys and indicators provided on the upper side panel 11 of the main body case are sent directly to the control unit 38, while key operation signals from the remote controller are received by the Ir reception part 35, and a code signal demodulated at an Ir processing part 36 is outputted to the control unit 38.

In addition, a voice processing part 47 is connected to the control unit 38 via the system bus (SB). This voice processing part 47 includes a sound source circuit such as a PCM sound source. When in a projection mode and a reproducing mode, the voice processing part 47 converts voice data into analog signals and drives a speaker 48 to output loudly sound or voice based on the voice data.

The control unit 38 controls a power supply control circuit 41, and this power supply control circuit 41 illuminates a light source of the light source unit 63 when the power supply switch is operated. Further, the control unit 38 causes a cooling fan drive control circuit 43 to detect temperatures through a plurality of sensors which are provided at the light source unit 63 and the like so as to control the rotational speed of a cooling fan based on the results of the temperature detection. The control unit 38 also causes the cooling fan drive control circuit 43 to make the cooling fan continue to rotate even after the power supply of the projector main body is switched off by use of a timer or the like and controls the power supply to the projector main body to be cut off depending upon the results of the temperature detection by the temperature sensors.

Figure 3:
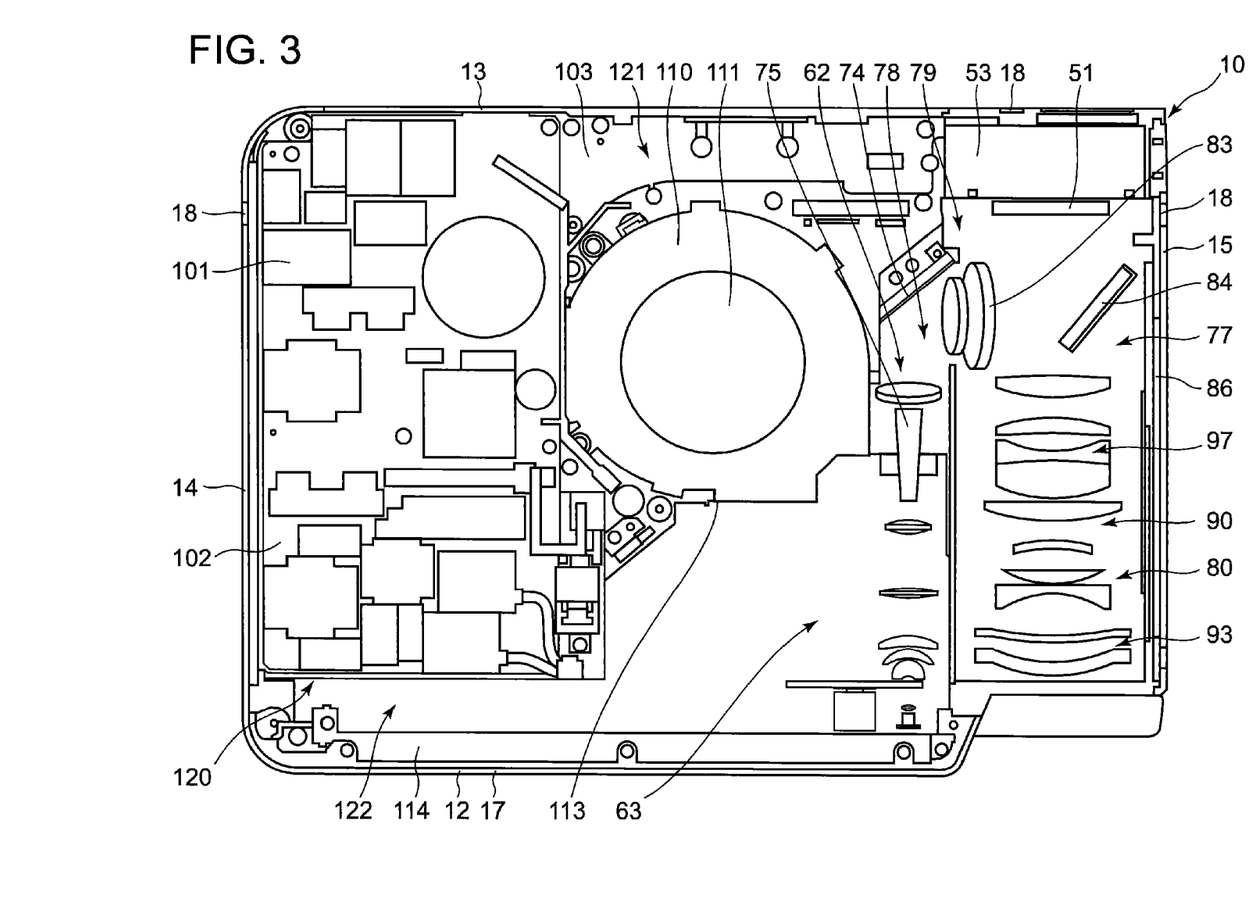
FIG. 3 is an exemplary plan view showing an internal construction of the projector utilizes the light source unit according to the invention.

Next, an internal construction of the projector 10 will be described. FIG. 3 is an exemplary plan view showing an internal construction of the projector 10. As is shown in FIG. 3, in the projector 10, a power supply control circuit board 102 on which a power supply circuit block 101 and the like are mounted is disposed in proximity to the right-hand side panel 14 and a sirocco fan-type blower 110 is disposed substantially at a center in the projector 10. In addition, a control circuit board 103 is disposed in proximity to the blower 110, and the light source 63 is disposed in proximity to the front panel 12, an optical system unit 70 being disposed in proximity to the left-hand side panel 15. In addition, an interior of a housing of the projector 10 is divided airtightly into an inlet side space compartment 121 which lies on the back panel 13 side and an outlet side space compartment 122 which lies on the front panel 12 side by a portioning bulkhead 120. The blower 110 is disposed so that its inlet port 111 is positioned in the inlet side space compartment 121 and its outlet port 113 is positioned on a boundary between the outlet side space compartment 122 and the inlet side space compartment 121.

The optical system unit 70 has a substantially U-shape and is made up of three blocks such as an illumination side block 78 which is positioned in proximity to the light source unit 63, an image generation block 79 which is positioned on the back panel 13 side, and a projection side block 80 which is positioned between the illumination side block 78 and the left-hand side panel 15.

The illumination side block 78 includes part of a light source side optical system 62 for guiding light emitted from the light source unit 63 to the display device 51 which is possessed by the image generation block 79. A light smoothing or light guiding device 75 for making a light beam emitted from the light source 63 into a light beam whose intensity is uniformly distributed and a light gathering lens for concentrating light that has been transmitted through the light guiding device 75 are included in the light source side optical system 62 that is possessed by the illumination side block 78.

The image generating block 79 has, as the light source side optical system 62, an optical axis varying mirror 74 for varying a direction of an optical axis of the light beam emitted from the light guiding device 75, a plurality of light gathering lenses for concentrating light reflected by the optical axis varying mirror 74 on to the display device 51 and a shining mirror 84 for shining the light beam that has been transmitted through the light gathering lenses on to the display device 51 at a predetermined angle. Further, the image generating block 79 includes a DMD which constitutes the display device 51, and a display device heatsink or cooling device 53 for cooling the display device 51 is disposed on a back panel 13 side of the display device 51 to thereby prevent the display device 51 from being heated to a high temperature.

The projection side block 80 has a lens group of a projection side optical system 90 which projects light on to the screen, which light is reflected by the display device 51 to form an image. The projection side optical system 90 constitutes a variable focus lens made up of a fixed lens group 93 which is incorporated in a fixed lens barrel and a movable lens group 97 which is incorporated in a movable lens barrel and having a zooming function. This variable focus lens enables zooming and focusing operations by moving the movable lens group 97 by a lens motor.

Figure 4:
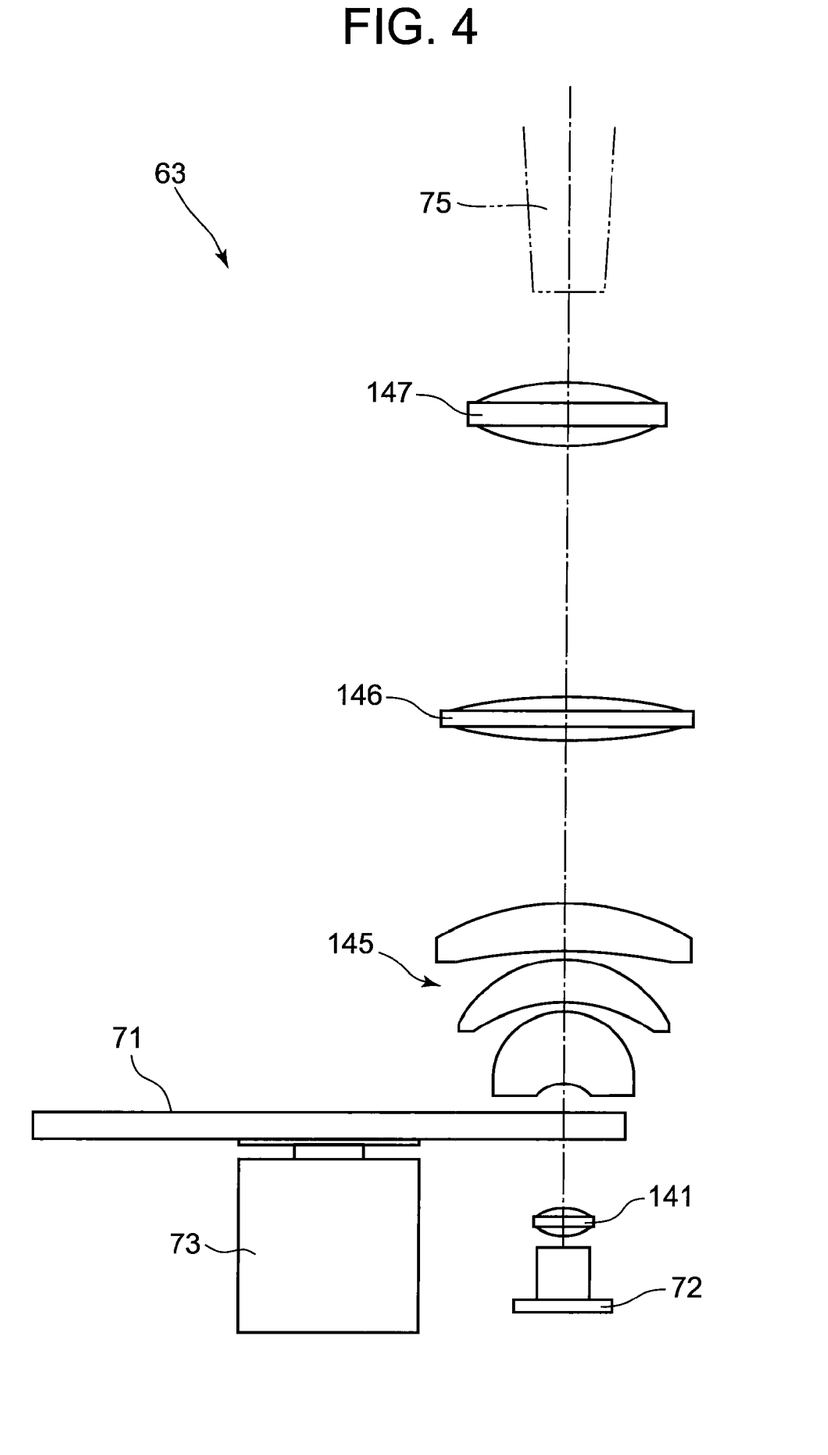
FIG. 4 is a plan view of the light source unit according to the invention.
Figure 5:
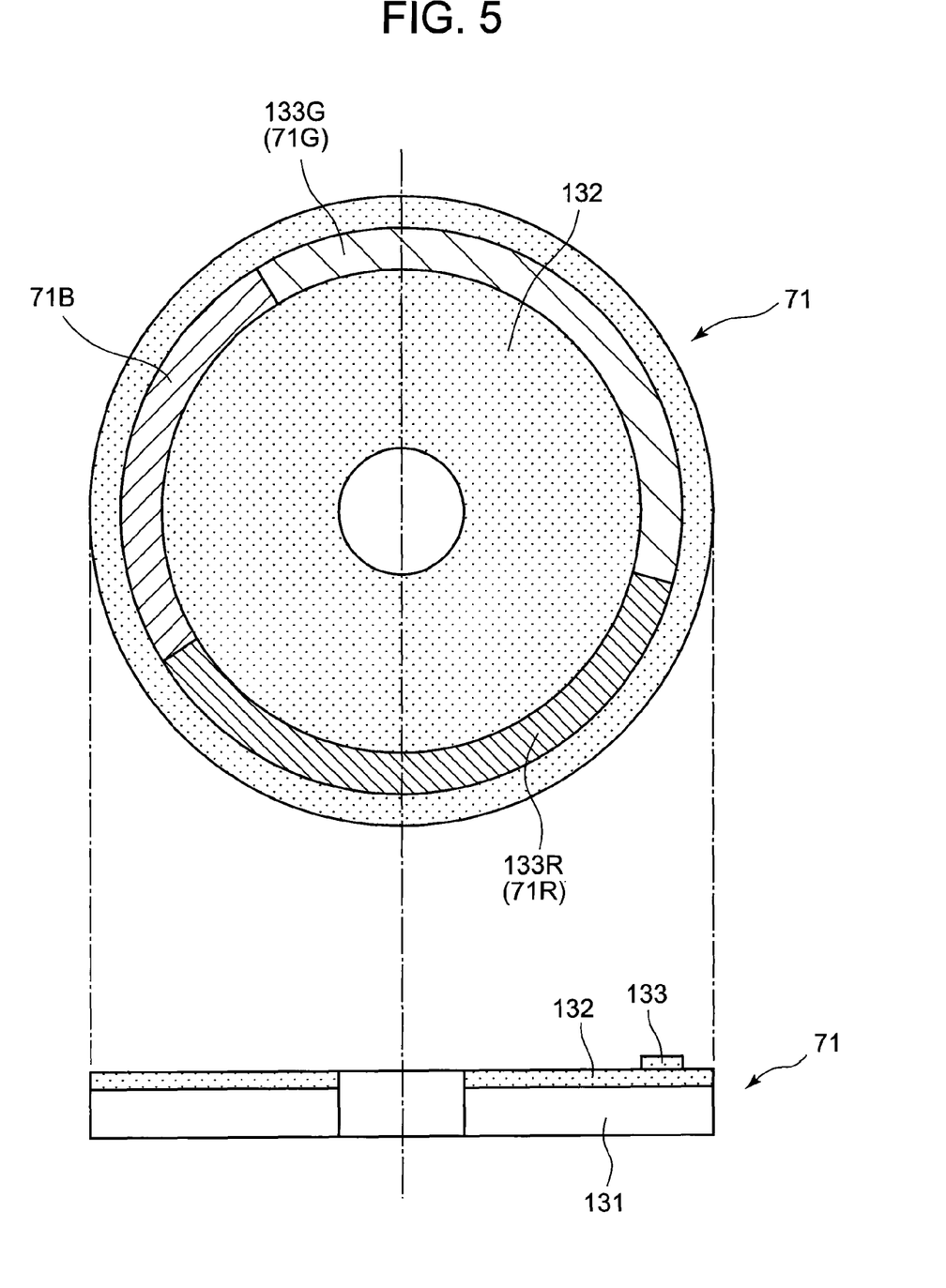
FIG. 5 shows a front view and a sectional exemplary view of a light emitting wheel of the light source unit according to the invention.

Next, the light source 63 of the projector 10 of the embodiment will be described. FIG. 4 is a plan view of the light source unit 63, and FIG. 5 shows a front view and a sectional exemplary view of a light emitting wheel 71. As is shown in FIG. 4, the light source unit 63 includes a light source 72 which is disposed so that its optical axis coincides with a center axis of the light guiding device 75, a light emitting wheel 71 which is disposed so that its wheel surface is at right angles to the optical axis of the light source 72, and a wheel motor 73 which drives to rotate the light emitting wheel 71.

A collimator lens 141 is disposed on an emerging side of the light source 72, and a light gathering or light gathering optical system made up of a plurality of lenses is disposed on an emerging surface side of the light emitting wheel 71 for allowing light emitted from the light emitting wheel 71 to be incident on the light guiding device 75. This light gathering optical system is made up of a light gathering or light gathering lens group 145 which is disposed in proximity to the light emitting wheel 71, a condenser lens 146 which is disposed on an optical axis of the light gathering lens group 145 and a light guiding device incident lens 147 which is disposed on an optical axis of the condenser lens 146 and in proximity to an incident surface of the light guiding device 75.

The light source 72 is a laser diode which emits laser light in the wavelength band of blue, that is, laser light in a wavelength of about 450 nm. Light emitted from the light source 72 is converted into parallel light by the collimator lens 141 and is shone on to the light emitting wheel 71 as laser light. This light source light is used as projection light in the wavelength band of blue or excitation light which excites fluorescent materials.

The light emitting wheel 71 emits beams of light in the wavelength bands of red, green and blue which constitute the three primary colors of light to the light guiding device 75 by receiving light emitted from the light source 72. As is shown in FIG. 5, this light emitting wheel 71 is formed into a circular disc shape and has an opening at the center thereof. Specifically, the light emitting wheel 71 is formed of a circular substrate 131 of glass which is highly light transmissive. In addition, minute irregularities are provided on an emerging surface which is a front surface of the circular substrate 131, and these minute irregularities form a diffusion layer 132 on the emerging surface of the circular substrate 131. Further, fluorescent material layers 133 are disposed on predetermined areas of the diffusion layer 132.

The minute irregularities forming the diffusion layer 132 are provided directly on the circular substrate 131 by sandblasting or the like. In order to convert laser light which is coherent light into incoherent light, the minute irregularities are provided at intervals ranging from several μm to several hundreds μm. A range from 10 μM to 100 μm is preferable.

An annular shining area is set on the light emitting wheel 71 which is made up of a belt-like red area 71R, a belt-like green area 71G and a belt-like blue area 71B which are provided end to end in a circumferential direction. The red area 71R emits light in the wavelength band of red, the green area 71G emits light in the wavelength band of green, and the blue area 71B emits light in the wavelength band of blue by light which is emitted from the light source and is diffused by the diffusion layer 132 being transmitted therethrough. An outside diameter of the annular shining area is made smaller than a diameter of the light emitting wheel 71 and is positioned on an optical axis of the light source 72.

A red fluorescent material layer 133R is disposed on the diffusion layer 132 in a position where the red area 71R lies for emitting light in the wavelength band of red using the light emitted from the light source 72 as excitation light. A green fluorescent material layer 133G is disposed on the diffusion layer 132 in a position where the green area 71G lies for emitting light in the wavelength band of green using the light from the light source 72 as excitation light.

The red fluorescent material layer 133R is formed by dispersing uniformly a red fluorescent material such as cadmium borate ($Cd_2B_2O_5$) on a member of silicone resin or glass which transmits visible light and emits light whose peak wavelength bands from 600 nm to 650 nm when receiving excitation light.

In addition, the green fluorescent material layer 133G is formed by dispersing uniformly a green fluorescent material such as zinc silicate ($ZnSiO_3$) on a member of silicone resin or glass which transmits visible light and emits light whose peak wavelength bands from 500 nm to 550 nm when receiving excitation light.

Light emitted from the light source 72 is shone on to the annular shining area of the light emitting wheel 71 by the collimator lens 141 and is diffused by the diffusion layer 132 after it has been transmitted through the circular substrate 131. A beam of diffused light is emitted to the front of the light emitting wheel 71 as projection light in the wavelength of blue in the blue area 71B, and in the red area 71R and the green area 71G, the diffused light beam functions as excitation light which excites the fluorescent material layers 133R, 133G. The individual fluorescent material layers 133R, 133G are excited by the excitation light to emit light in the wavelength bands of red and green and the light so emitted is then emitted forwards as projection light.

Light emitted from the light emitting wheel 71 is emitted to the light gathering lens group 145 and the light is then concentrated by the light gathering lens group 145. Thereafter, the light so concentrated is incident on the condenser lens 146 and is then concentrated further to be incident on the light guiding device incident lens 147. The beam of light incident on the light guiding device incident lens 147 is shone on to an incident surface of the light guiding device 75 to enter the light guiding device 75 and is converted into light whose intensity is uniformly distributed by the light guiding device 75 for emission to the optical system thereafter.

In addition, the rotation of the light emitting wheel 71 is controlled by the wheel motor 73. The light emitting wheel 71 can emit light in a predetermined wavelength band in a time sharing fashion by emitting light in the wavelength bands of red, green and blue, which constitute the three primary colors of light, in response to the rotation control by the wheel motor 73. The light emitted in the time sharing fashion is reflected by micromirrors on the display device 51 to a projection side as an image, whereby a color image can be projected.

In this embodiment, while the light source 72 is described as being made up of the blue laser diode which emits laser light in wavelength band of blue, a configuration can be adopted in which the light source 72 can be made up of an ultraviolet laser diode which emits ultraviolet light and a blue area 71B is provided on the diffusion layer 132 where a blue fluorescent material layer is disposed which emits light in the wavelength band of blue. As this occurs, calcium wolframate ($CaWO_4$) can be used as a blue fluorescent material. In this way, by adopting the configuration in which the fluorescent material is also used for light in the wavelength band of blue, the light source 72 can be disposed at various angles with respect to the light emitting wheel 71, thereby making it possible to facilitate the arrangement of the light source unit 63 within a housing of space-saving electric equipment. In addition, an increase in quantity of light can easily be realized by disposing a plurality of ultraviolet laser diodes.

In this embodiment, while the diffusion layer 132 and the fluorescent material layers 133 are described as being formed on the same plane on an emerging surface side of the light emitting wheel 71, the invention is not limited to this configuration. For example, the following configurations can be adopted; a configuration in which the diffusion layer 132 and the fluorescent material layers 133 are formed on the same plane on an incident surface side of the light emitting wheel 71, a configuration in which the diffusion layer 132 is formed on the incident surface side and the fluorescent material layers 133 are formed on the opposite emerging surface side of the light emitting wheel 71 or a configuration in which the fluorescent material layers 133 are formed on the incident surface side and the diffusion layer 132 is formed on the opposite emerging surface side of the light emitting wheel 71. In any case, a configuration may only have to be provided in which light from the light source unit 72 can be prevented from being emitted to the outside of the light source unit or the projector in the form of coherent light by forming the diffusion layer 132 made up of the minute irregularities on part of the light emitting wheel 71, even in the event that the florescent material layers 133 are dislodged for some reason.

According to the light source unit 63 of the embodiment, even in the event that the fluorescent material layers 133 are dislodged from the light emitting wheel 71 or light from the light source is shone on an area lying outside the annular shining area on the light emitting wheel 71, light emitted from the light source 72 can be prevented from being emitted in the form of coherent light to the outside of the light source unit or the projector by forming the diffusion layer 132 on one of the surfaces of the light emitting wheel 71, thereby making it possible to provide the light source unit 63 which is highly safe. In addition, since there is no such situation that coherent light emitted from the light source 72 is shone to various devices disposed within the light source unit 63 or the housing of the projector 10 while remaining in the form of coherent light, adverse effects such as failure or deterioration with age of the devices can be prevented which would otherwise be caused by light of high output and high energy being shone thereto. Further, since the diffusion layer 132 is made by forming minute irregularities on part of the circular substrate 131 of the light emitting wheel 71, there exists no risk that the diffusion layer 132 is dislodged from the light emitting wheel 71, thereby making it possible to provide the light source unit 63 which is made safer.

In addition, forming the irregularities which form the diffusion layer 132 at intervals ranging from 10 μm to 100 μm can convert light from the light source into safe light without largely reducing the utilization efficiency of light emitted from the light source.

Using the blue laser diode which emits laser light in the wavelength band of blue as the light source 72 enables the use of light in the wavelength band of blue so emitted as excitation light for exciting the red fluorescent material and the green fluorescent material because energy carried by laser light in the wavelength band of blue is high. In addition, by causing the blue laser light to be transmitted through the diffusion layer 132, the laser blue light can also be used as light in the wavelength band of blue. This enables a reduction in the number of fluorescent material layers to be used which are relatively expensive, thereby making it possible to produce the light source unit 63 at inexpensive cost.

Further, the light emitting wheel 71 is formed of the circular substrate 131 which has high light transmission properties and the red fluorescent material layer 133R and the green fluorescent material layer 133G are disposed on the one surface of the circular substrate 131. This enables the emission of light of red, green and blue colors which are the three primary colors of light, and therefore, the light source unit 63 can be used as a light source for various types of electric equipment.

Using the light source unit 63 described above in the projector 10 allows the projector 10 to consume less electricity than when the projector 10 uses a conventional discharge lamp and makes the projector 10 safer than when the projector 10 uses conventional laser light.

Figure 6:
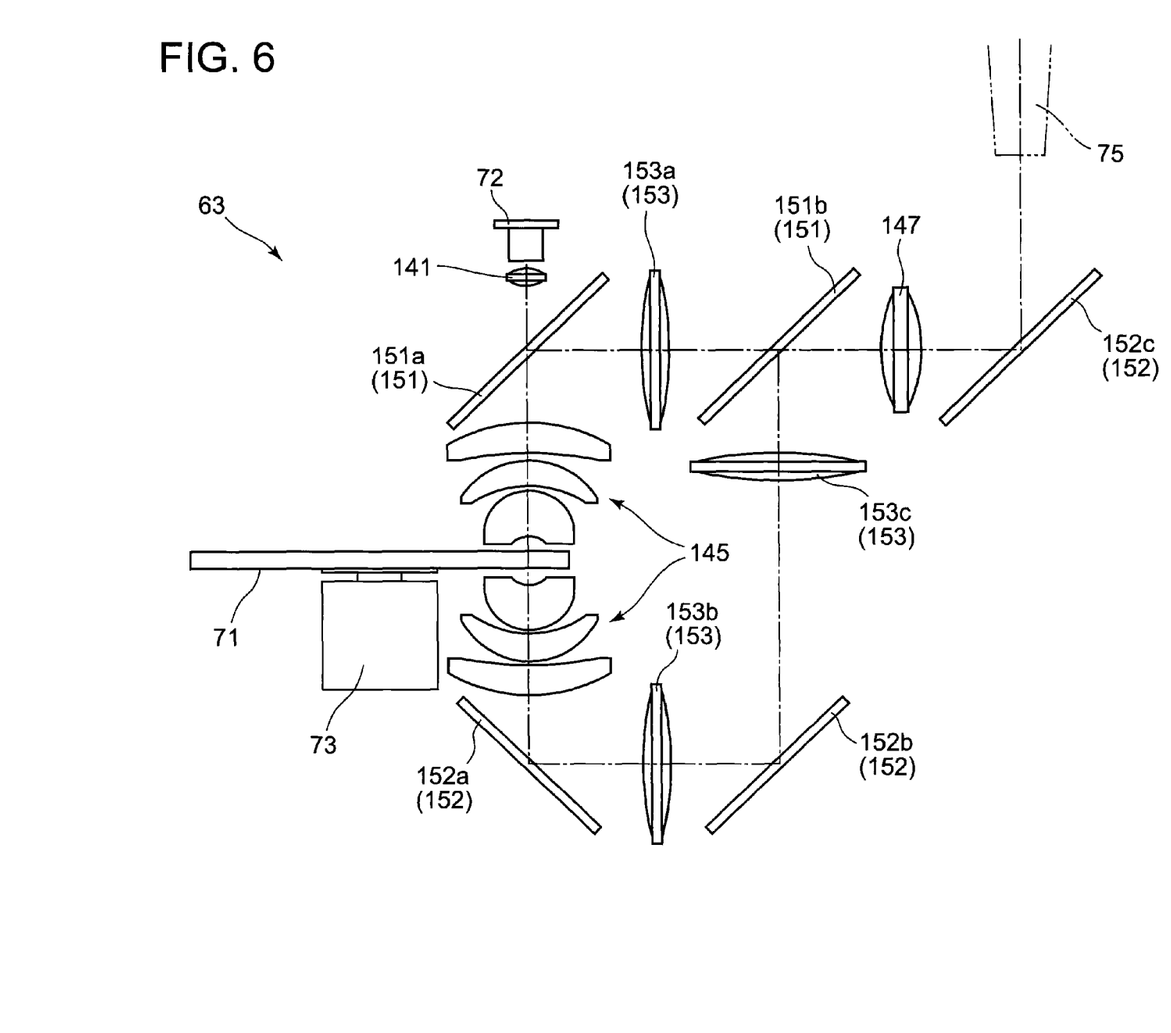
FIG. 6 is a plan view of a light source unit according to a modified example of the invention.
Figure 7:
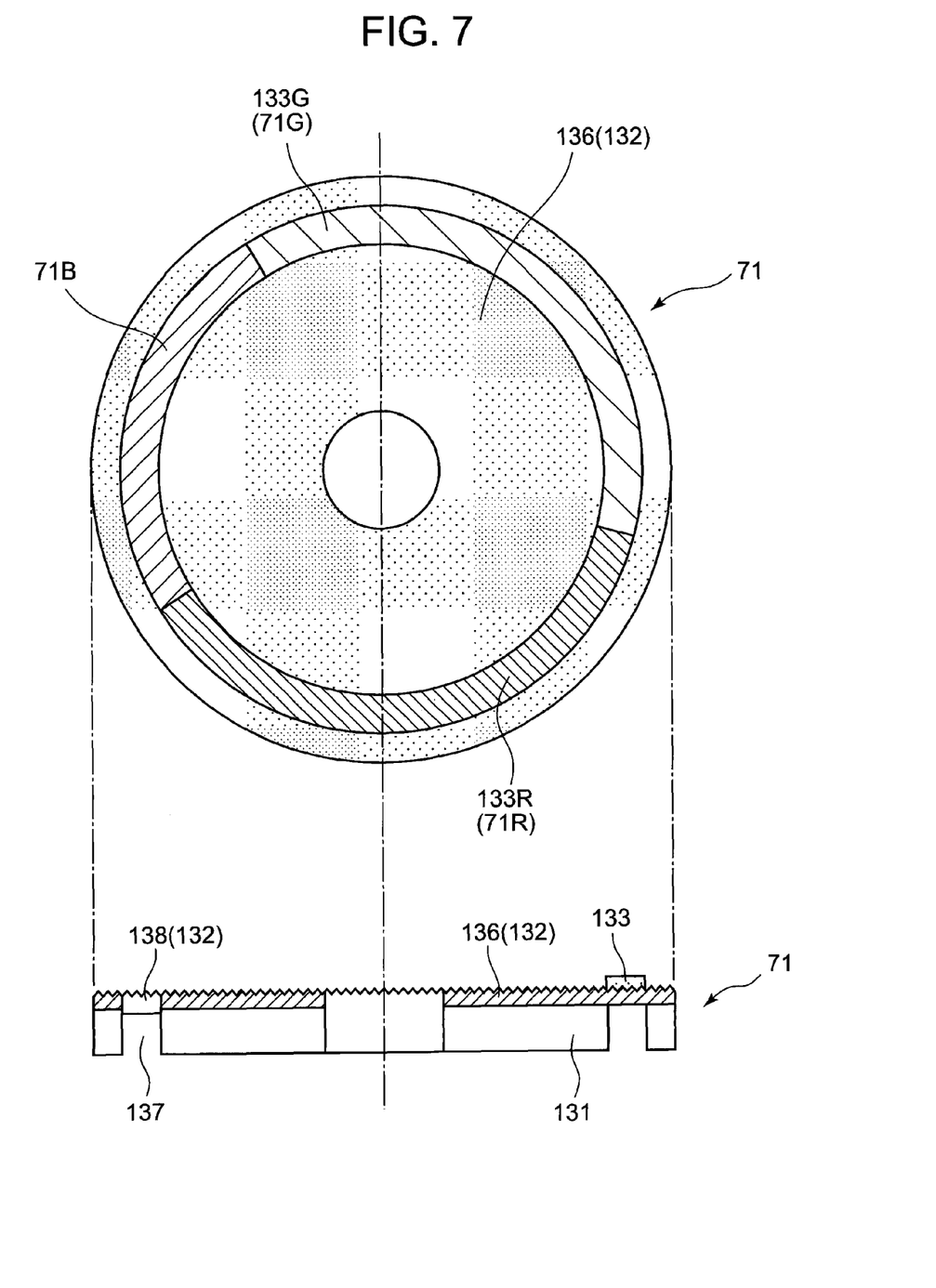
FIG. 7 shows a front view and a sectional exemplary view of a light emitting wheel of the light source unit according to the modified example of the invention.

Next, a light source unit 63 according to a modified example of the invention will be described. FIG. 6 is a plan view of the light source unit 63 according to the modified example, and FIG. 7 shows a front view and a sectional exemplary view of a light emitting wheel 71 of the modified example. As is shown in FIG. 6, the light source unit 63 includes a light source 72, a light emitting wheel 71 which receives light emitted from the light source 72 to thereby emit light in the wavelength bands of red, green and blue, which constitute the three primary colors of light, towards a light guiding device 75 and a wheel motor 73 for driving to rotate the light emitting wheel 71. The light emitting wheel 71 emits light in the wavelength bands of red and green towards the light source 72 side and emits light in the wavelength band of blue from a surface on an opposite side to a side of the light emitting wheel 71 which faces the light source 72.

In the light source unit 63, a collimator lens 141 is disposed in front of the light source 72, and a light gathering or light gathering optical system is disposed to be deployed from in proximity to both the surfaces of the light emitting wheel 71 to the light guiding device 75, the light gathering optical system being made up of light gathering or light gathering lens groups 145, a plurality of dichroic mirrors 151, a plurality of reflecting mirrors 152, a plurality of convex lenses 153 and a light guiding device incident lens 147.

Following this, the light gathering optical system will be described. A primary dichroic mirror 151a is disposed between the light source 72 and the light emitting wheel 71 which reflects light in the wavelength bands of red and green which is emitted from the light emitting wheel 71 and transmits light in the wavelength band of blue which emerges from the light source. This primary dichroic mirror 151a transmits light in the wavelength band of blue which emerges from the light source 72 and reflects light in the wavelength bands of red and green which is emitted from the light emitting wheel 71 so that the direction of the light is changed through 90 degrees so as to be directed towards the light guiding device 75.

The light gathering lens groups 145 are disposed individually in proximity to the front surface of the light emitting wheel 71, that is, in proximity to the surface on the side thereof which is positioned to face the light source 72 and in proximity to the rear surface of the light emitting wheel 71. The light gathering lens group 145 in proximity to the front surface of the light emitting wheel 71 concentrates light from the light source so as to be shone to the light emitting wheel 71 and concentrates light in the wavelength bands of red and green which is emitted from the light emitting wheel 71 so as to be shone to the primary dichroic mirror 151a. The light gathering lens group 145 in proximity to the rear surface of the light emitting mirror 71 concentrates light in the wavelength band of blue which has passed through the light emitting wheel 71 so as to be shone to a primary reflecting mirror 152a.

A primary convex lens 153a is disposed in front of the primary dichroic mirror 151a, that is, in the direction of the light guiding device 75 so as to concentrate a beam of light which is reflected on the primary dichroic mirror 151a. A second dichroic mirror 151b is disposed in front of the primary convex lens 153a which transmits light in the wavelength band of red and light in the wavelength band of green and reflects light in the wavelength band of blue so that the direction of the blue light is changed through 90 degrees in the direction of the light guiding device 75.

A primary reflecting mirror 152a is disposed on the side of the light emitting wheel 71 from which blue light emerges so as to reflect blue light from the light emitting wheel 71 at 90 degrees to thereby be directed towards the light guiding device 75. A secondary convex lens 153b is disposed in front of the primary reflecting mirror 152a and concentrates a beam of light which is reflected on the primary reflecting mirror 152a so as to be shone to a secondary reflecting mirror 152b. The secondary reflecting mirror 152b reflects a beam of light which has passed through the secondary convex lens 153b at 90 degrees towards the light guiding device 75 side. A tertiary convex lens 153c is disposed in front of the secondary reflecting mirror 152b and concentrates the beam of light which is reflected on the secondary reflecting mirror 152b so as to be shone to the secondary dichroic mirror 151b.

Further, the light guiding device incident lens 147 is disposed in front of the secondary dichroic mirror 151b, and a tertiary reflecting mirror 152c is disposed in front of the light guiding device incident lens 147 and reflects the beam of light which has passed through the light guiding device incident lens 147 so that the direction of the beam of light is changed through 90 degrees in the direction of the light guiding device 75.

In this way, since optical axes of the beams of light of the respective colors which emerge from the light emitting wheel 71 can be changed so as to coincide with an optical axis of the light guiding device 75 by disposing the plurality of dichroic mirrors 151 and the plurality of reflecting mirrors 152, light emerging from the light emitting wheel 71 repeats reflection and transmission so as to be incident on the light guiding device 75.

In addition, as with the embodiment that has been described before, the light source 72 is made up of a laser diode which emits laser light in the wavelength band of blue. Laser light emerging from the light source 72 is converted into parallel light by the collimator lens 141 so as to be shone to the light emitting wheel 71.

As is shown in FIG. 7, the light emitting wheel 71 has a circular disc shape and has an opening in the center thereof. The light emitting wheel 71 is formed of a circular substrate 131 of metal or the like which has high heat conducting properties. In addition, a reflecting layer 136 is formed on a front surface of the circular substrate 131 which functions as a diffusion layer 132 made up of minute irregularities, and fluorescent material layers 133 are disposed on predetermined areas on the reflecting layer 136. Further, a belt-like opening 137 is formed in the circular substrate 131, and a light transmissive plate 138 having a function as a diffusion layer 132 made up of minute irregularities is disposed so as to seal the opening 137 so formed.

The reflecting layer 136 is such that a mirror finish is applied thereto by forming minute irregularities on the circular substrate 131 through etching or the like and depositing silver or the like on the minute irregularities. The light transmissive plate 138 is formed by forming minute irregularities on a surface of a transparent glass plate through sandblasting or the like.

An annular shining area is set on the light emitting wheel 71 which is made up of a belt-shaped red area 71R, a belt-shaped green area 71B and a belt-shaped blue area 71B which are disposed end to end in a circumferential direction. In the red area 71R, fluorescent light in the wavelength band of red emerges from an incident surface side of the light emitting wheel 71 where light from the light source is incident. In the green area, fluorescent light in the wavelength band of green emerges from the incident surface side of the light emitting wheel 71 where light from the light source is incident. In the blue area 71B, light in the wavelength band of blue which is diffused passes through the light emitting wheel 71 so as to emerge from the opposite surface of the light emitting wheel 71 to the surface thereof from which red and green light beams emerge.

A red fluorescent material layer 133R is disposed on the red area 71R which emits light in the wavelength band of red by use of light emerging from the light source 72 as excitation light. A green fluorescent material layer 133G is disposed on the green area 71G which emits light in the wavelength band of green by use of light emerging from the light source 72 as excitation light. The blue area 71B is formed of the opening 137 and the light transmissive plate 138.

Light emerging from the light source 72 is converted into parallel light by the collimator lens 141, passes through the primary dichroic mirror 151a and is concentrated by the light gathering lens group 145 so as to be shone in proximity to the annular shining area of the light emitting wheel 71.

In the event that the red area 71R or the green area 71G is located in a position where light from the light source is shone, most of light emerging from the light source constitutes excitation light which excites a fluorescent material on the red fluorescent material layer 133R or the green fluorescent material layer 133G, and each fluorescent material emits fluorescent light in every orientation. The fluorescent light emitted to the light source 72 side is concentrated by the light gathering lens group 145, is then reflected by the primary dichroic mirror 151a and is finally shone to the primary convex lens 153a. In addition, the fluorescent light emitted to the light emitted to the light emitting wheel 71 side is diffused and reflected by the reflecting layer 136 and part of the light so diffused and reflected is emitted to the light source 72 side to constitute effective light.

Further, part of light from the light source which is shone to the red fluorescent material layer 133R or the green fluorescent material layer 133G passes through the fluorescent material layer 133 to thereby be shone to the reflecting layer 136, is then diffused and reflected by the reflecting layer 136 and is incident on the fluorescent material layer 133 again as excitation light. Light from the light source which is shone to the outside of the belt-shaped annular shining area is diffused and reflected by the reflecting layer 136, passes through the light gathering lens group 145 and the primary dichroic mirror 151a and is emitted in the direction of the light source 72.

In the event that the blue area 71B is located in the position where light from the light source is shone, light from the light source is incident on the light transmissive plate 138, passes through the light transmissive plate 138 after having been diffused by the minute irregularities on a surface thereof and is emitted from the opening 137 in the light emitting wheel 71 to the rear surface side of the light emitting wheel 71. The beam of light that has been emitted to the rear surface side of the light emitting wheel 71 is concentrated by the light gathering lens group 145 to thereby be shone to the primary reflecting mirror 152a, and is then reflected by the primary reflecting mirror 152a to thereby be incident on the secondary convex lens 153b.

According to the modified example, the configuration is adopted in which the light emitting wheel 71 is formed by the metallic plate having the high heat conducting properties, and the reflecting layer 136 including the minute irregularities is formed on the surface of the metallic plate. By this configuration, since the beam of light shone to the light emitting wheel 71 is made into diffused light by the minute irregularities without fail, there is no such situation that laser light is emitted directly to the outside of the light source unit 63 or the projector 10, thereby making it possible to provide the light source unit 63 which is highly safe. In addition, by adopting the configuration in which light in the wavelength band of blue is caused to emerge from the rear surface side of the light emitting wheel 71, light from the light source can be used as light in the wavelength band of blue. Because of this, light in the wavelength band of blue can be produced without using a light fluorescent material layer 133 which is relatively expensive. Thus, as has been described heretofore, the modified example can provide the light source unit which is inexpensive and highly safe.

Further, light from the light source which is shone to places which are out of the annular shining area on the light emitting wheel 71 is reflected by the reflecting layer 136 to thereby be shone to the primary dichroic mirror 151*a*. As this occurs, since the primary dichroic mirror 151*a* transmits light from the light source, light in the wavelength bands of red and green is separated from blue reflected light, whereby only light in the wavelength band of red or green is guided to the light guiding device 75. As a result, a projected image can be obtained in which lightness and color saturation are represented high.

In addition, in the modified example, while the configuration is adopted in which the fluorescent material layers 133 and the reflecting layer 136 are formed on the same plane on the incident surface side of the light emitting wheel 71, the invention is not limited thereto. A configuration may be adopted in which the fluorescent material layers 133 are formed on the incident surface side of the light emitting wheel 71, while the reflecting layer 136 is formed on the emerging surface side thereof.

Further, other than the modified example described above, the invention can be utilized in various optical system configurations.

For example, the light emitting wheel 71 can be made up of only the green fluorescent material layer which emits green light using blue laser light shone from the light source 72 as excitation light by being disposed on a part of the diffusion layer 132.

In this configuration, the optical system configuration requires a red light source (such as LED) additionally for shining red light.

The light emitting wheel 71 can be made up of only the green fluorescent material layer which emits green light using blue laser light shone from the light source 72 as excitation light by being disposed on a whole surface of the diffusion layer 132.

In this configuration, in addition to the light source 72 for emitting blue laser light, the optical system configuration requires a red light source (such as LED) for shining red light and blue light source (such as LED) for shining blue light. The applicant has filed separate applications for inventions which disclose specific configurations and functions with respect to the optical system configurations described in the aforementioned examples.

In addition, the invention is not limited to the embodiment and the modified example but can be modified or improved without departing from the spirit and scope thereof.

While the invention has been described based on the various typical embodiment and modified example, the invention is not limited thereto. Consequently, the scope of the invention is limited only by the scope of claims.

What is claimed is:

1. A light source unit comprising:
    a blue laser light source for emitting laser light in the wavelength band of blue;
    a circular-shaped substrate as a light emitting wheel which is configured so as to be rotatably driven, in which fluorescent material layers for emitting light by using the laser light emitted from the blue laser light source as excitation light are disposed in a circumferential direction of the circular-shaped substrate in an annular shining area so as to be positioned on an optical axis of the blue laser light source;
    wherein the circular-shaped substrate is formed by a material having heat conducting properties and has a reflecting layer as a diffusion layer which is formed all over a surface at a side of the circular-shaped substrate opposite the blue laser light source and which is made up of minute irregularities at intervals ranging from 10 μm to 100 μm;
    wherein the fluorescent material layers are disposed on the reflecting layer and are constituted by a red area and a green area each of which respectively emits light in the wavelength band of red and light in the wavelength band of green by using the laser light emitted from the blue laser light source as excitation light;
    wherein an opening is formed in a part of the circular-shaped substrate, a light transmissive plate having a function as a diffusion layer made up of minute irregularities on the light transmissive plate is disposed so as to seal the opening, and the opening diffuses and transmits the blue laser light emitted from the blue laser light source;
    wherein when the blue laser light emitted from the blue laser light source is incident on the fluorescent material layers as excitation light, the reflecting layer reflects toward the blue laser light source both the lights which are respectively emitted by the fluorescent material layers, and the laser light from the blue laser light source that is transmitted through the fluorescent material layers so that the laser light from the blue light source that is transmitted through the fluorescent material layers is reflected to be incident again on the fluorescent material layers as excitation light; and
    wherein a dichroic mirror is disposed between the blue laser light source and the circular-shaped substrate so as to transmit the laser light emitted from the blue laser light source and reflect the lights emitted from the fluorescent material layers.

2. The light source unit as set forth in claim 1, wherein the reflecting layer is configured such that a mirror finish is applied thereto by forming the minute irregularities on the circular substrate by etching and depositing silver on the minute irregularities.

3. The light source unit as set forth in claim 1, wherein the light transmissive plate is configured by forming the minute irregularities on the surface thereof by sandblasting.

4. The light source unit as set forth in claim 3, wherein the light transmissive plate is configured by forming the minute irregularities on the surface thereof by sandblasting.

5. A projector comprising:
    a light source unit;
    a light guiding device;
    a display device;
    a projection side optical system; and
    a projector controller;
    wherein the light source unit is the light source unit set forth in claim 1; and
    wherein projection is implemented by emitting light in predetermined wavelength bands by controlling rotation of the light emitting wheel.

6. A projector comprising:
    a light source unit;
    a light guiding device;
    a display device;
    a projection side optical system; and
    a projector controller;
    wherein the light source unit is the light source unit set forth in claim 2; and
    wherein projection is implemented by emitting light in predetermined wavelength bands by controlling rotation of the light emitting wheel.

7. A projector comprising:
a light source unit;
a light guiding device;
a display device;
a projection side optical system; and
a projector controller;
wherein the light source unit is the light source unit set forth in claim 3; and
wherein projection is implemented by emitting light in predetermined wavelength bands by controlling rotation of the light emitting wheel.

8. A projector comprising:
a light source unit;
a light guiding device;
a display device;
a projection side optical system; and
a projector controller;
wherein the light source unit is the light source unit set forth in claim 4; and
wherein projection is implemented by emitting light in predetermined wavelength bands by controlling rotation of the light emitting wheel.

* * * * *

UNITED STATES PATENT AND TRADEMARK OFFICE
CERTIFICATE OF CORRECTION

| | | |
|---|---|---|
| PATENT NO. | : 8,523,367 B2 | |
| APPLICATION NO. | : 12/749709 | |
| DATED | : September 3, 2013 | |
| INVENTOR(S) | : Naotsuga Ogura | |

It is certified that error appears in the above-identified patent and that said Letters Patent is hereby corrected as shown below:

In the claims

Column 14, claim 4, line 1, delete "claim 3" and insert --claim 2--.

Signed and Sealed this
Fifteenth Day of March, 2016

Michelle K. Lee
*Director of the United States Patent and Trademark Office*